(12) United States Patent
Mosayyebpour et al.

(10) Patent No.: US 11,100,932 B2
(45) Date of Patent: Aug. 24, 2021

(54) ROBUST START-END POINT DETECTION ALGORITHM USING NEURAL NETWORK

(71) Applicant: SYNAPTICS INCORPORATED, San Jose, CA (US)

(72) Inventors: Saeed Mosayyebpour, Irvine, CA (US); Francesco Nesta, Aliso Viejo, CA (US); Trausti Thormundsson, Irvine, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 16/723,932

(22) Filed: Dec. 20, 2019

(65) Prior Publication Data
US 2020/0126556 A1 Apr. 23, 2020

Related U.S. Application Data

(63) Continuation-in-part of application No. 15/894,883, filed on Feb. 12, 2018, now Pat. No. 10,762,891.

(60) Provisional application No. 62/457,663, filed on Feb. 10, 2017, provisional application No. 62/465,723, filed on Mar. 1, 2017.

(51) Int. Cl.
| | |
|---|---|
| G10L 15/00 | (2013.01) |
| G10L 15/22 | (2006.01) |
| G06F 16/68 | (2019.01) |
| G06N 3/04 | (2006.01) |
| G06N 3/08 | (2006.01) |
| G10L 15/02 | (2006.01) |
| G10L 25/24 | (2013.01) |
| G10L 15/16 | (2006.01) |
| G10L 15/06 | (2013.01) |

(Continued)

(52) U.S. Cl.
CPC ............ *G10L 15/22* (2013.01); *G06F 16/686* (2019.01); *G06N 3/049* (2013.01); *G06N 3/0454* (2013.01); *G06N 3/084* (2013.01); *G10L 15/02* (2013.01); *G10L 15/05* (2013.01); *G10L 15/063* (2013.01); *G10L 15/16* (2013.01); *G10L 25/24* (2013.01); *G10L 2015/088* (2013.01)

(58) Field of Classification Search
CPC ......... G10L 15/00; G10L 17/00; G10L 19/00; G10L 15/22; G10L 15/02; G10L 15/05; G10L 15/063; G10L 15/16; G10L 25/24; G10L 2015/088; G06F 16/686; G06N 3/0454; G06N 3/049; G06N 3/084
See application file for complete search history.

(56) References Cited

U.S. PATENT DOCUMENTS 5,155,763 A * 10/1992 Bigus ..................... G06N 3/105
                                                    379/111
5,583,961 A * 12/1996 Pawlewski .............. G10L 25/87
                                                    704/241

(Continued)

*Primary Examiner* — Michael Colucci
(74) *Attorney, Agent, or Firm* — Haynes and Boone, LLP

(57) ABSTRACT

An end detector configured to receive the feature data and detect an end point of a keyword, and a start detector configured to receive an indication of the detected end point and process the feature data associated with corresponding input frames to detect a start point of the keyword. The start detector and end detector comprise neural networks trained through a process using a cross-entropy cost function for non-Region of Target (ROT) frames and a One-Spike Connectionist Temporal Classification cost function for ROT frames.

20 Claims, 6 Drawing Sheets

(51) Int. Cl.
*G10L 15/05* (2013.01)
*G10L 15/08* (2006.01)

(56) References Cited

U.S. PATENT DOCUMENTS

| | | | | |
|---|---|---|---|---|
| 5,621,857 A * | 4/1997 | Cole | | G10L 15/16 |
| | | | | 704/231 |
| 5,630,023 A * | 5/1997 | Oteki | | G06F 7/68 |
| | | | | 706/41 |
| 5,732,394 A * | 3/1998 | Nakadai | | G10L 15/04 |
| | | | | 704/238 |
| 5,749,066 A * | 5/1998 | Nussbaum | | G10L 15/063 |
| | | | | 704/232 |
| 5,812,974 A * | 9/1998 | Hemphill | | G10L 15/18 |
| | | | | 704/256.4 |
| 6,041,299 A * | 3/2000 | Schuster | | G10L 15/16 |
| | | | | 704/232 |
| 6,470,261 B1 * | 10/2002 | Ng | | G06K 9/00785 |
| | | | | 701/117 |
| 6,615,382 B1 * | 9/2003 | Kang | | H04L 1/0009 |
| | | | | 714/748 |
| 7,110,526 B1 * | 9/2006 | Dezonno | | H04M 3/5232 |
| | | | | 379/265.02 |
| 8,675,839 B1 * | 3/2014 | Noble, Jr. | | H04M 3/5232 |
| | | | | 379/112.08 |
| 9,191,304 B1 * | 11/2015 | Plate | | H04L 12/6418 |
| 9,436,876 B1 * | 9/2016 | Carlson | | G06K 9/00744 |
| 9,466,292 B1 * | 10/2016 | Lei | | G10L 15/16 |
| 9,723,144 B1 * | 8/2017 | Gao | | H04M 3/5238 |
| 9,792,897 B1 * | 10/2017 | Kaskari | | G10L 15/02 |
| 10,013,640 B1 * | 7/2018 | Angelova | | G06K 9/00624 |
| 10,114,554 B1 * | 10/2018 | Gonzalez | | G06F 3/0647 |
| 10,229,672 B1 * | 3/2019 | Rao | | G10L 15/16 |
| 10,388,272 B1 * | 8/2019 | Thomson | | G10L 15/063 |
| 10,522,134 B1 * | 12/2019 | Matsoukas | | G10L 15/01 |
| 2003/0115041 A1 * | 6/2003 | Chen | | G10L 19/002 |
| | | | | 704/200.1 |
| 2003/0225786 A1 * | 12/2003 | Hall | | G06Q 30/02 |
| 2005/0216426 A1 * | 9/2005 | Weston | | G06K 9/6256 |
| | | | | 706/12 |
| 2005/0261898 A1 * | 11/2005 | Van Klinken | | H04L 25/03019 |
| | | | | 704/219 |
| 2010/0004932 A1 * | 1/2010 | Washio | | G10L 15/05 |
| | | | | 704/255 |
| 2010/0198054 A1 * | 8/2010 | Ewing | | A61B 5/055 |
| | | | | 600/420 |
| 2011/0224975 A1 * | 9/2011 | Li | | G10L 15/08 |
| | | | | 704/203 |
| 2015/0340032 A1 * | 11/2015 | Gruenstein | | G06N 3/0472 |
| | | | | 704/232 |
| 2015/0381809 A1 * | 12/2015 | Fleming | | H04M 3/5232 |
| | | | | 379/265.11 |
| 2016/0048766 A1 * | 2/2016 | McMahon | | G06N 20/20 |
| | | | | 706/12 |
| 2017/0005644 A1 * | 1/2017 | Sayeh | | G02F 1/00 |
| 2017/0083829 A1 * | 3/2017 | Kang | | G06N 3/0454 |
| 2017/0092298 A1 * | 3/2017 | Nakamura | | G01S 3/80 |
| 2017/0133038 A1 * | 5/2017 | Jiang | | G10L 15/187 |
| 2017/0148431 A1 * | 5/2017 | Catanzaro | | G10L 25/18 |
| 2017/0249551 A1 * | 8/2017 | Iljazi | | G06F 3/0623 |
| 2017/0263255 A1 * | 9/2017 | Jeong | | G10L 15/183 |
| 2017/0323643 A1 * | 11/2017 | Arslan | | G10L 17/00 |
| 2017/0344829 A1 * | 11/2017 | Lan | | G06K 9/00369 |
| 2017/0372197 A1 * | 12/2017 | Baughman | | A23L 33/30 |
| 2018/0121800 A1 * | 5/2018 | Kanda | | G06N 3/084 |
| 2018/0203848 A1 * | 7/2018 | Perez | | G10L 25/30 |
| 2018/0233130 A1 * | 8/2018 | Kaskari | | G10L 15/16 |
| 2018/0253648 A1 * | 9/2018 | Kaskari | | G06N 3/084 |
| 2020/0250539 A1 * | 8/2020 | Liu | | G06N 3/0481 |

* cited by examiner

ROBUST START-END POINT DETECTION ALGORITHM USING NEURAL NETWORK

CROSS-REFERENCE TO RELATED APPLICATIONS

This application is a continuation-in-part of U.S. patent application Ser. No. 15/894,883, filed Feb. 12, 2018, titled "Binary and Multi-Class Classification Systems and Methods Using Connectionist Temporal Classification," which claims the benefit of and priority to both U.S. Provisional Patent Application No. 62/457,663 filed Feb. 10, 2017 and entitled "Connectionist Temporal Classification (CTC) Network Using Cross-Entropy Cost Function for Binary Classification" and U.S. Provisional Patent Application No. 62/465,723 filed Mar. 1, 2017 and entitled "Recurrent Network For Connectionist Temporal Classification (CTC) Using Segmented Labeled Sequence Data," all of which are incorporated herein by reference in their entirety.

TECHNICAL FIELD

The present disclosure relates generally to start and/or end point detection in an audio sample, and more particularly, for example, to the detection of start-end points in an audio sample using a neural network in a speech recognition system.

BACKGROUND

Recurrent neural networks are commonly used in information classification systems, such as binary classification applications for speech recognition, which may include keyword spotting and multi-class classification speech recognition (e.g., phoneme recognition). Many conventional approaches are highly complex and result in implementations that are not practical for use in applications with memory, power and processing limitations, such as applications running on mobile phones and other low power devices. Efforts to reduce complexity often come at the cost of less flexibility, memory inefficiencies, and other undesirable performance measures. In view of the foregoing, there is a continued need in the art for solutions to optimize information classification systems that are fast, accurate and resource efficient.

SUMMARY

In various embodiments, keyword spotting systems and methods are provided that are suitable for many low power, low memory implementations. including real-time implementations. The embodiments disclosed herein utilize a recurrent neural network such as Long Short-Term Memory (LSTM) to train a model to recognize the start point and end point of a keyword or phrase in a continuous context. A cost function efficiently enforces the neural network to detect the keyword with one spike sometime during the ROT. The cost function can be efficiently implemented within the computational and memory constraints of many systems.

In various embodiments, a start-end point detection system trains two separate models to detect the start point and end point of a keyword (or phrase including more than one word). The start-end point detection system receives an audio input signal, such as audio stream, which is provided to a feature extractor configured to compute feature values for each frame of the audio input signal. The features are provided as inputs to an end detector, which may be implemented as a recurrent neural network trained to detect an end point of a keyword in the input audio stream. If the end point is detected, then a start detector comprising a neural network trained to detect the start point of the keyword will process a buffered copy of the computed feature values for frames preceding the end point in the audio stream.

The end detector is trained to produce one spike at the end of a keyword and then a separate start detector is trained to detect the start point of the same keyword. In various embodiments, the start detector is trained with an input dataset including the features of the audio input arranged backward from the position of the detected end point (e.g., from a point previously detected by the end point detector). The end detector is trained with audio data having a labeled end point of an acoustic event to be detected (e.g., a keyword or a phrase). The label identifies the transition end point of the keyword with an accurate window. The start detector may be trained with the same audio data with a label marking the start point of the keyword. This region marking which trains the network to spike one-time during the marking duration for keyword detection comprises a Region of Target (ROT).

In various embodiments, a method for detecting a start point and an end point of a keyword includes receiving an audio input stream including a plurality of audio frames, extracting from each audio frame features representative of the audio frame, detecting an end point in the extracted features using a first neural network, providing an indication to a second neural network when an end point is detected, and detecting a start point in the extract features from audio frames preceding the detected end point in the audio input stream using the second neural network. The feature extraction may include generating Mel-frequency cepstral coefficients (MFCCs) for each frame of the audio input stream.

In other embodiments, a method for training a start-end point detection system may include receiving, at a computing device, a stream of training data including a plurality of input samples having segmented labeled data. The first neural network computes a network output for each input sample in a forward pass through the training data; and updates weights and biases through a backward pass through the first neural network, including determining whether an input frame is in a Region of Target (ROT) for the end of the keyword. The method may further include updating weights and biases of the first neural network based on a cross-entropy cost function for non-ROT frames and a One-Spike Connectionist Temporal Classification (OSCTC) cost function for ROT frames. The first neural network is trained using the OSCTC cost function to cause the neural network to spike one time during ROT.

In various embodiment, a system includes a feature extractor configured to receive an audio input stream comprising a sequence of frames and generate corresponding feature data for each frame, an end detector configured to receive the feature data and detect an end point of an acoustic event, and a start detector configured to receive an indication of the detected end point and process the feature data associated with corresponding input frames to detect a start point of the acoustic event.

In some embodiments, two neural networks are trained. One is used to detect the end-point and the other one is trained to detect the start-point. The end-point network will use the end-point ROT and the input features will be fed to the network from start to the end, but the start-point network will use the start-point ROT and the input features are fed to the network backward from end to start. Both networks may use the One-Spike Connectionist Temporal Classification (OSCTC) cost function for ROT frames. For non-ROT frames, the cross-entropy cost function is used.

In some embodiments, the end detector comprises a neural network trained to generate a detection probability for the end point of the keyword, and the end point is detected when the detection probability is greater than a pre-determined end-point threshold. The start detector comprises a neural network trained to generate a detection probability for the start point of the keyword, and the start point is detected when the detection probability is greater than a pre-determined start point threshold. The system can be extended to detect the start/end point of multiple classes. To this end, multi-class classification network for each detector (start detector and end detector) should be used.

The scope of the disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Aspects of the disclosure and their advantages can be better understood with reference to the following drawings and the detailed description that follows. The included drawings are for illustrative purposes and serve only to provide examples of possible systems and methods for the disclosed methods and systems. These drawings in no way limit any changes in form and detail that may be made to that which is disclosed by one skilled in the art without departing from the spirit and scope of this disclosure.

DETAILED DESCRIPTION

The present disclosure provides systems and methods for start point and end point detection of a keyword or phrase in an audio input stream. The accurate detection of the start point and end point of an acoustic event (e.g., a keyword or phrase), as disclosed herein allows for a reduction in subsequent processing of the audio data and an improvement in classification results.

Consider, for example, a speaker verification technique based on template matching. The exact timing of an utterance will generally not be the same as that of the template. The template and utterance will also have different durations. In many cases the accuracy of alignment depends on the accuracy of the start point and end point detections.

The robust start-end point detection systems and methods disclosed herein efficiently and accurately handle a variety audio situations found in one or more particular implementations, which may include, for example, words which begin or end with low-energy phonemes (e.g., weak fricatives), words which end with an unvoiced plosive, words which end with a nasal, speakers ending words with a trailing off in intensity or a short breath (noise), words which overlaps with structured background noise having low signal to noise ratio (SNR), words which overlap with other interfering speech, and other audio situations.

Conventional energy-based methods do not perform well in many of the above situations. As a result, the performance of a speech recognition system such as speaker identification for biometrics using template matching often depends on an accurate estimation of start-end point detection of the keyword. In the present disclosure, a robust model-based algorithm is presented which can perform exceptionally well in high nonstationary noise scenarios such as environments with TV noise generating background speech.

Start-End Point Detection System

Figure 1:
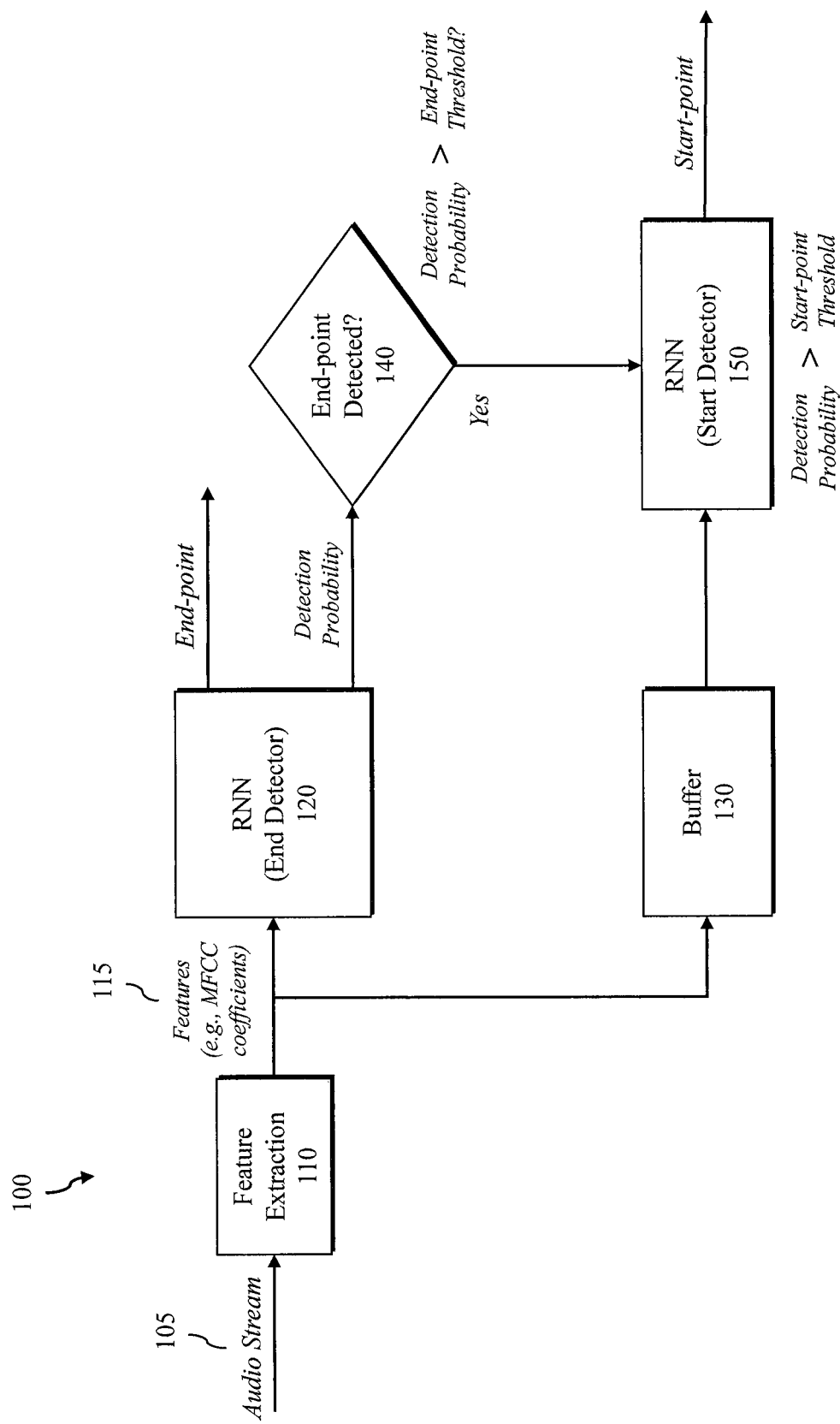
FIG. 1 illustrates a start-end point detection system, in accordance with one or more embodiments of the present disclosure.

In various embodiments, a start-end point detection system trains two separate models to detect the start and end point of a keyword or phrase consisting of one word or more words. A Recurrent Neural Network (RNN) such as a Long Short-Term Memory (LSTM) network is used to train each model. A start-end point detection system 100 in accordance with one or more embodiments is illustrated in FIG. 1. As illustrated, an input signal, such as audio stream 105, is provided to a feature extractor 110, which is configured to compute feature values for each frame. In one embodiment, the feature extractor 110 is configured to compute Mel-frequency cepstral coefficients (MFCCs) 115 for each frame of the audio stream 105. The MFCC coefficients 115 for each frame are stored in a buffer 130. The buffer is a memory or other storage having a size sufficient to store and process the largest keyword to be detected by the system 100. The MFCC coefficients 115 for each frame are also provided as inputs to an end detector 120, which may be implemented as an RNN model trained to detect an end point in the audio stream 105.

The end detector 120 is trained to generate an output with a probability of detecting the keyword or other acoustic event. In one embodiment, this probability is compared with a predetermined threshold to determine whether the keyword is detected or not. If the keyword is detected, the position of detection will be considered as the end point of the keyword. The detection is done sometimes during a region which is called ROT of the end point. If the end point is detected (step 140), then a start detector 150 (an RNN model trained to detect the start point) will be used to detect the start of the keyword. The input features (e.g., MFCC coefficients 115) stored in the buffer 130 are used as the input to the start detector 150. In the illustrated embodiment, the start detector 150 will only run if the detection of keyword is confirmed at step 140. The input features stored in the buffer will be fed to the start detector backward. To improve the performance of keyword spotting for false accept rejection, in some embodiments the output probability of the start detector 150 can be compared with a start point threshold to further validate the detection of the keyword.

To build the model for the start-end detector 100 using a RNNs, the end detector 120 is first trained to spike one-time at the end of a keyword and then a separate start detector 150 (a trained RNN as described herein) is trained to detect the start point. One difference between the training of the end detector 120 and the start detector 150 is that the start detector 150 sees the features of the input (e.g., MFCC coefficients) backward from the position of the end point which is already been detected by the end detector 120.

In various embodiments, both RNN models generally follow the same procedure for training, except the start detector 150 training data consists of sequences of samples which are detected by the end detector 120, while the end detector 120 continually receives a stream of features representing both keyword and non-keyword input. In operation, the input features (e.g., MFCC Coefficients) provided to the start-detector 150 will be fed backward from the end point toward the start point. Both models may be trained with a training dataset that includes labeled audio data. The end detector 120 is trained with audio data with the end of the keyword labeled. This label (ROT of the end-point) marks the transition end part of the keyword with an accurate window. The start detector 150 may be trained with the same audio data with a label marking the start point of the keyword (ROT of the start-point). This region marking which trains the network to spike one-time during the marking duration for keyword detection comprises a Region of Target (ROT).

Figure 2:
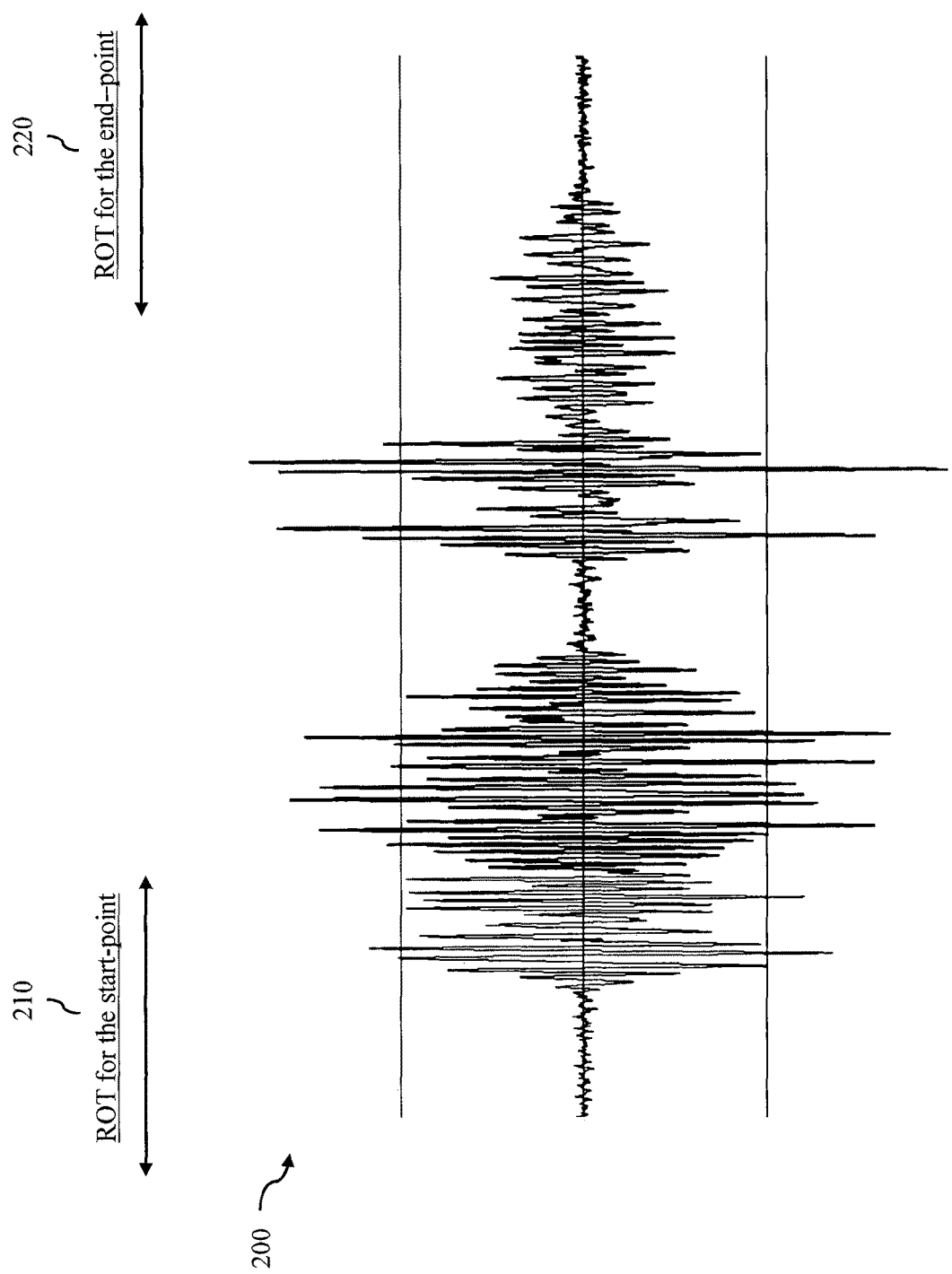
FIG. 2 illustrates an example of Region of Target (ROT) for end-point and start-point of a keyword, in accordance with one or more embodiments of the present disclosure.

FIG. 2 is an example of audio waveform 200 for a keyword. The end-point and start-point of this keyword is marked with two ROT windows in the beginning (ROT 210) and at the end (ROT 220) of the keyword. The detection of end-point or start-point will be done at one frame during the ROT window. The frames in the audio input stream from the start point to the end point may comprise a ROT for the end point detection and another ROT for the start-point detection. As illustrated, the ROT includes the transitions of the keyword at the start-point and the end-point. The ROT 220 for the end-point (or ROT 210 for the start-point) is defined as a region in which the keyword end-point (or start-point) should be detected at any time during this region. In some embodiments where OSCTC is used for the detection in the ROT, only one frame of ROT would be responsible to detect the end-point (or start-point) of the keyword.

Figure 3:
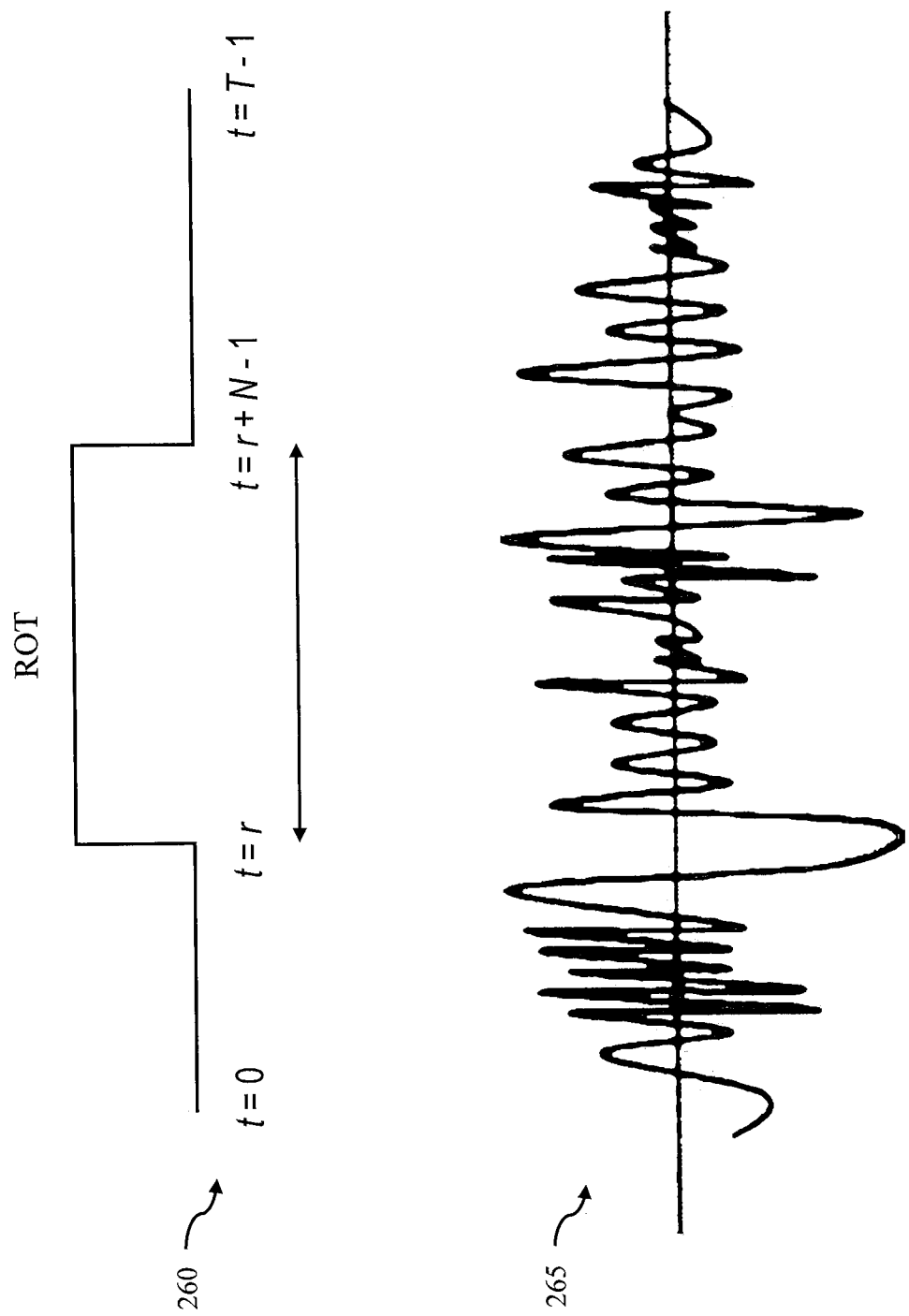
FIG. 3 illustrates an example of ROT labeling in audio stream. The ROT label can be the start or end part of a keyword.

An example of ROT labeling is shown in FIG. 3 where the event of interest is to detect the start or end of a keyword in an audio sequence. The ROT plot shown in this figure is either the ROT of the end-point or start-point of a keyword. As illustrated, an example input in the form of an audio waveform 265 is provided and divided into a sequence of audio frames 260 (e.g., a sequence of frames n in order from frame 0 to frame T−1). The ROT for this example is defined to be from frame $n_r$ until $n_{r+N−1}$. The label values in the ROT are one and in other frame (non-ROT) are zero.

Figure 4:
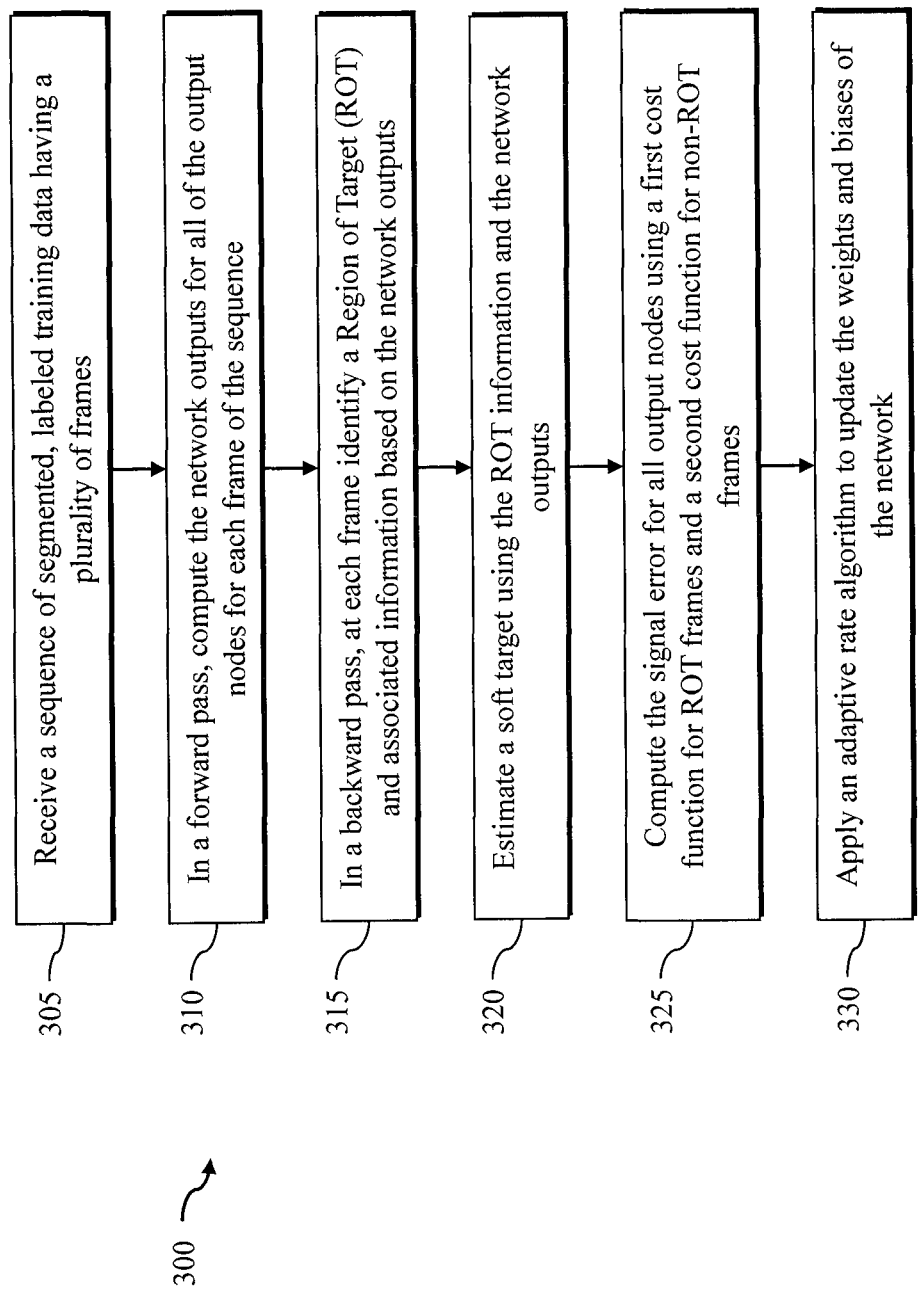
FIG. 4 is a flow diagram illustrating a process for training a detector system (e.g., a start detector or an end detector), in accordance with one or more embodiments of the present disclosure.

FIG. 4 illustrates a process 300 for training a neural network for detecting a start point and/or end point of an acoustic event, such as for keyword detection. The process 300 may be used to train start detector 150 and end detector 120 of FIG. 1. In step 305, the system receives a sequence of segmented, labeled training data. In some embodiments, training data includes an audio channel comprising a stream of frames, with each frame including a corresponding label in a second channel. The labeling may correspond to an identification/marking of the start point and end point of the keyword. In a forward pass through the neural network (step 310), the training data is provided to an input layer of the neural network which computes an output for each frame of the training sequence. Next, in step 315, a backward pass through neural network is performed using the network output. In the backward pass, a Region of Target (ROT) is identified, which may include ROT labeling of the sequence of frames to identify the starting and ending points of the ROT at a frame level. In step 320, soft targets are estimated using the ROT information and the network outputs. The signal error for all output nodes is calculated in step 325. Finally, in step 330, an adaptive rate algorithm is applied to update the weights and biases of the network.

The process estimates the soft target according to the ROT and the network's output in step 320. In one embodiment, a goal is to cause the network to predict the start or end of a keyword one time at any frame during the ROT (ROT frames include $n_r$<frame index<$n_{r+N−1}$).

To train the network two cost functions are used, namely cross-entropy for non-ROT frames and a One-Spike Connectionist Temporal Classification (OSCTC) cost function for ROT frames $n_{L−1}$. For non-ROT frames, the cross-entropy cost function is used which is equals to maximizing the logarithm of the probability of being in non-ROT at each frame. This is aligned with a goal of having zero outputs for all the frames of non-ROT The signal error which is the derivative of the cost function with respect to the unnormalized output $z_n^{(m)}$ for non-ROT frames for class m (i.e. class m at frame n-th frame does not belong to any ROT) is as follows:

$$\delta_n^{(m)} = -y_n^{(m)}$$

$$y_n^{(m)} = \frac{1}{1 - e^{-z_n^{(m)}}}$$

where $y_n^{(m)}$ and $\delta_n^{(m)}$ are the output of network at frame n for m-th class and the signal error for the m-th class of the network output, respectively. It is assumed that we have M classes and each class corresponds to a keyword.

If class m at n-th frame belongs to a ROT, then the signal error using the OSCTC cost function is as follows:

$$\delta_n^{(m)} = t_n^{soft} - y_n^{(m)}$$

$$t_n^{soft} = \frac{p_{n-r}}{P_{ROT}}$$

$$P_{ROT} = \sum_{i=0}^{N-1} P_i$$

$$P_i = y_{r+i}^{(k)} \prod_{\substack{j=0 \\ j \neq i}}^{N-1} (1 - y_{r+j}^{(k)})$$

$$y_n^{(m)} = \frac{1}{(1) - (e)^{-z_n^{(m)}}}$$

The disclosed system may be used to improve detection of the start-end point of a keyword. This can be used as a component for speaker identification systems. In speaker identification system based on template matching, the start-end point of each keyword is required to accurately compare the test sample with the templates of different speakers to recognize the speaker ID.

The disclosed system can be used to improve the performance of keyword spotting to reject the False Alarm (FA). This can be done by using the start detector model to not only estimate the start point of the keyword but also revalidate the keyword by comparing the output probability of the start detector model with a threshold. The start detector model can be trained so that its FA is mostly orthogonal to the end detector model, which may greatly improve the performance of keyword spotting.

The disclosed systems and methods can be used to obtain the segmented data for revalidation on the cloud. This will improve the performance of the keyword spotting in high noise environments. Furthermore, end point detection, which aims to distinguish the speech and non-speech segments of a digital speech signal, is considered as one of the key preprocessing steps in automatic speech recognition (ASR) systems. One major factor in overall recognition performance is end point accuracy. Proper estimation of the start and end of the speech (versus silence or background noise) avoids the waste of ASR evaluations on preceding or ensuing silence. Conversely, accurate end point detection leads to efficient computation and, more importantly, to accurate recognition since proper end points will result in good alignment for template comparison. So accurate end point detection is particularly important for the isolated word recognition systems.

Figure 5:
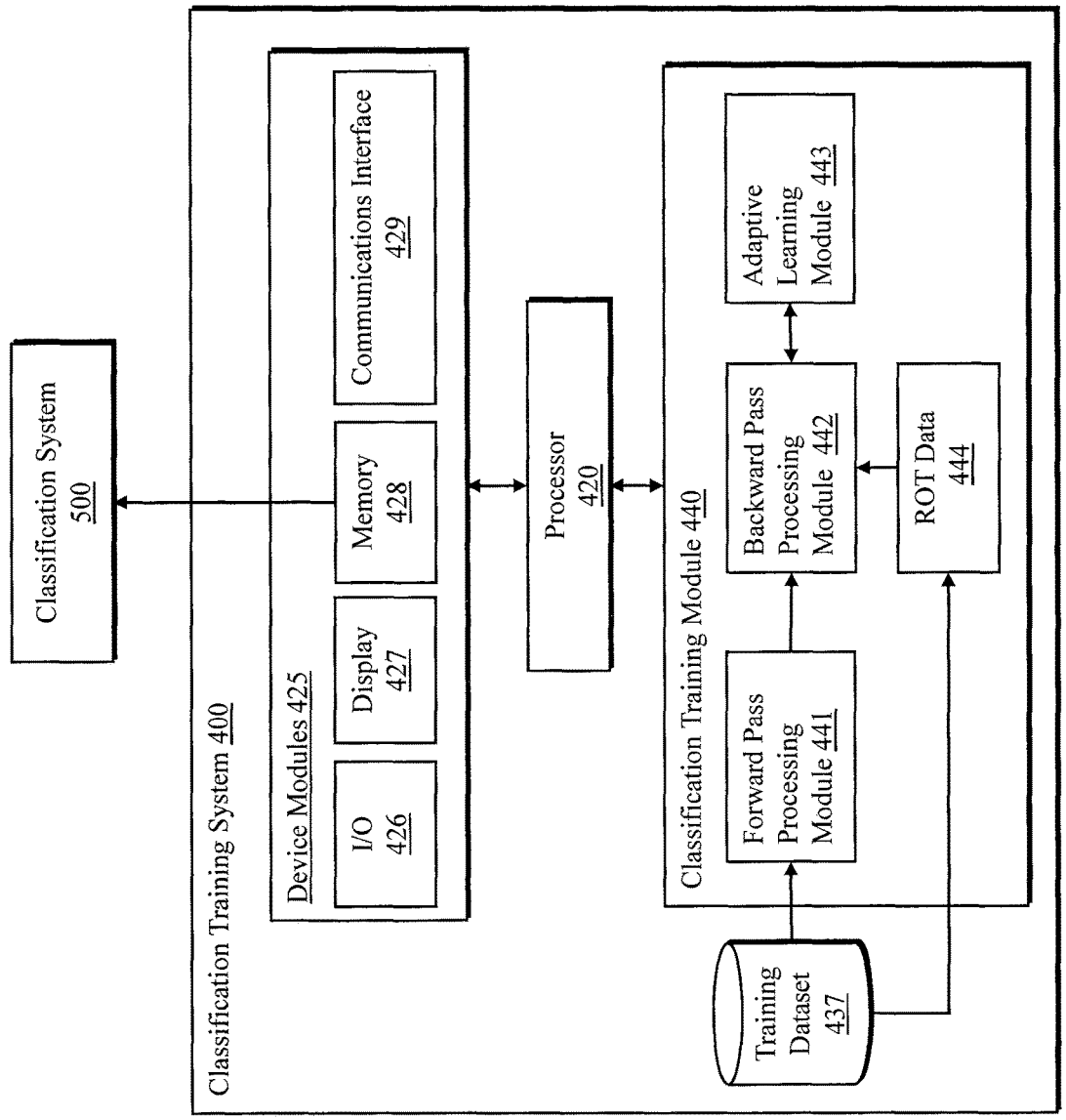
FIG. 5 is a block diagram illustrating an example detecting and classification training system, in accordance with one or more embodiments of the present disclosure.

FIG. 5 illustrates an exemplary classification training system 400 of some embodiments that performs at least part of the start-end point training process described above. The classification training system 400 is programmed to perform the training processes described above and includes the training dataset 437 which contains the pre-segmented labeled training data including keywords with labeled start and end points. Training dataset 437 is connected to a classification training module 440, which includes a ROT module 444. The ROT module 444 (e.g., an ROT table) is built using the information about the segmented training data provided by training dataset 437. The classification training module 440 also includes a forward pass processing module 441 programmed to perform the forward pass process described herein and a backward pass processing module 442 programmed to perform the backward pass processes described herein. In various embodiments, the classification training module 440 may be configured to train a start detector neural network and an end detector neural network for detecting the start and end of a keyword in an input stream.

The adaptive learning module 443 includes one or more adaptive learning algorithms that can be used by the backward pass processing module to update the weights and biases of a neural network, such as a recurrent neural network. In some of these embodiments, the classification training module 440 can iteratively perform the training processes using different training data to continuously improve and update the neural network. The classification training module 440 can store the updated neural network in the memory 428.

The classification training system 400 may further include a processor 420, which can include central processing unit, a micro-controller, a digital signal processor (DSP), or other processing components, for controlling and facilitating the operations of the classification training system 400, including controlling communications with internal and external devices.

The classification training system 400 further includes one or more communication channels such as a bus for facilitating communication of data between various components of the classification system 400. Components may include device modules 425 for providing device operation and functionality, which may include input/output components 426 such as a touch screen, keyboard, mouse, etc., a display 427 such as a monitor, a memory 428 such as RAM, solid state drive, disk drive, database, etc., and a communications interface 429. In some embodiments, the communications interface 429 may include a network interface (e.g., Ethernet interface) or a wireless transceiver for enabling the classification training system 400 to communicate with remote devices over a network. In operation, the neural network is trained by the classification training system 400 offline and the trained model including the weights and biases of the neural network may be stored in classification system 500 for online classification of audio data.

Figure 6:
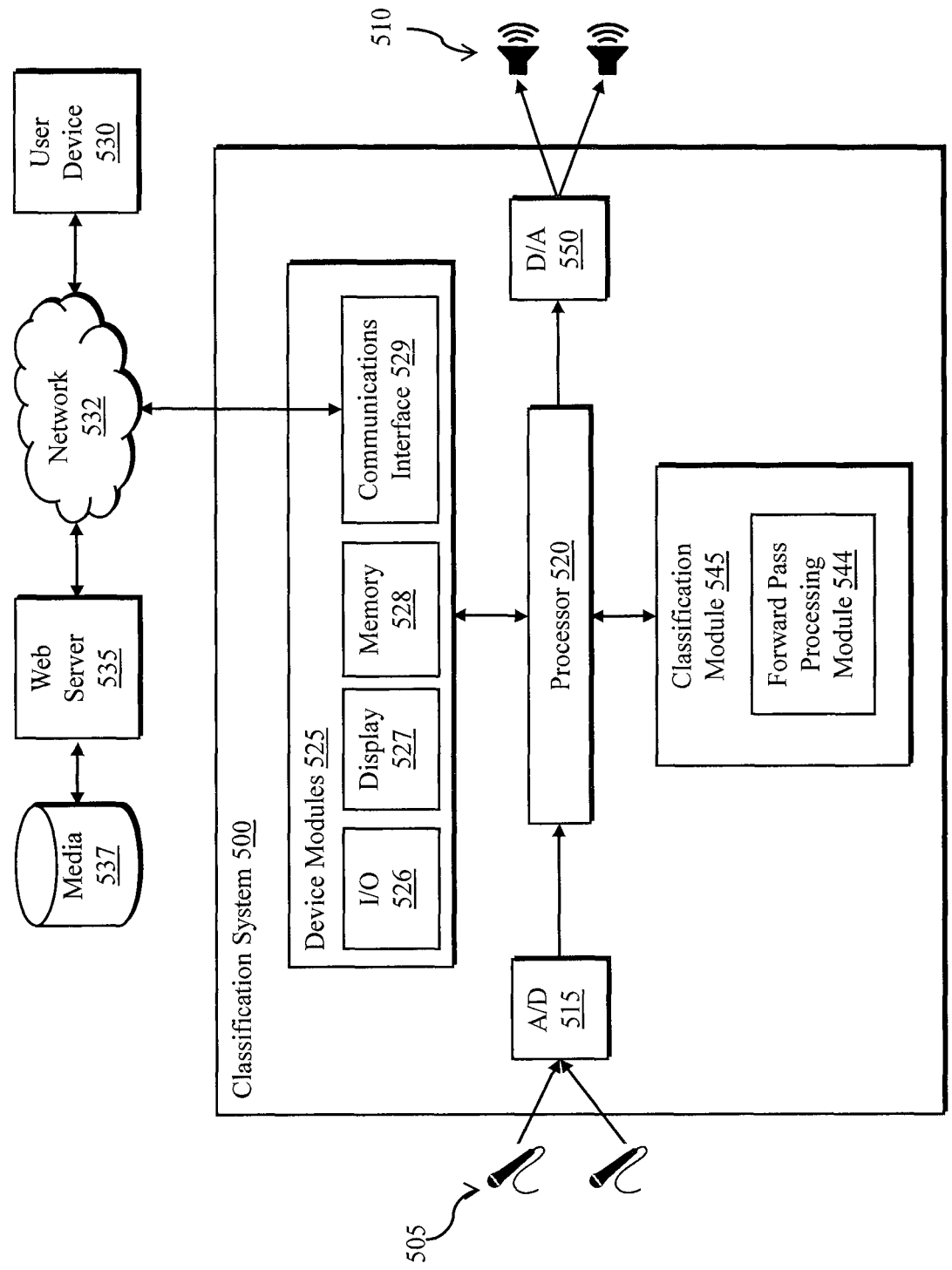
FIG. 6 is a block diagram illustrating an example detection and class classification system, in accordance with one or more embodiments of the present disclosure.

Referring to FIG. 6, an exemplary classification system 400 of some embodiments is illustrated that performs at least part of the start-end point detection process, described herein. The classification system 500 may be implemented as a mobile device, such as a smart phone or a laptop computer, a television or display monitor, a display computer, a smart speaker, a voice activated assistant, a computer server, an automobile, a speech recognition system, or any other device that provides audio keywords (e.g., commands) recognition capability. The classification system 500 is communicatively coupled with one or more audio inputting devices 505 such as a microphone or microphone array and, optionally, also with one or more audio outputting devices 510 such as a loudspeaker.

In some embodiments, the classification system 500 can include an analog-to-digital converter 515 that converts the analog audio signals received from the audio inputting devices 505 into digital audio signals and sends the digital audio signals to processor 520, which can be a central processing unit, a micro-controller, a digital signal processor (DSP), or other processing components, for controlling and facilitating the operations of the classification system 500, including controlling communications with internal and external devices. The classification system 500 may also include a digital-to-analog converter 550 that converts digital audio signals generated by the different modules and components of the classification system 500 to analog signals before transmitting the analog signals to the one or more audio outputting devices 510.

The classification system 500 includes one or more communication channels such as a bus for facilitating communication of data between various components of the classification system 500. Components may include device modules 525 for providing device operation and functionality, which may include input/output components 526 such as a touch screen, keyboard, mouse, etc., a display 527 such as a monitor, a memory 528 such as RAM, solid state drive, disk drive, database, etc., and a communications interface 529. In some embodiments, the communications interface 529 may include a network interface (e.g., Ethernet interface) or a wireless transceiver for enabling the classification system to communicate with remote devices over a network 532. Remote devices may include user devices 530 (e.g., household appliances, other user electronics, etc.), or a web server 535 that is communicatively coupled with a media storage 537.

The classification system 500 also includes a classification module 545 programmed to implement the trained neural network, which is trained and/or updated by the classification training system 400. The classification module 545 includes a trained forward pass processing module 544 for classifying audio input. In one embodiment, Forward Pass Processing Module 544 is programmed to perform classification and prediction on audio input data received from audio inputting devices 505. In various embodiments, the classification module 545 may include other classification and analysis components, including parts of an automatic speech recognition module such as language processing providing voice command processing, an image search and classification system, an object detection system, or other application configured for use with the trained neural network as described herein.

The forward pass processing module 544 can generate a response in real-time or close to real-time of the audio input data. In some embodiments, the classification module 545 can be programmed to output the response as an audio sound via the digital-to-analog converter 550 and the audio outputting devices 510. Instead of, or in addition to, producing an audio signal, the classification module 545 can be programmed to send a signal to an external device (e.g., to initiate an action or a transaction through the external device) based on the generated response. For example, the classification system 500 can be part of or communicatively coupled with a smart home system, and send a signal to a user device (e.g., a household appliance) via a network 532 (e.g., a local area network within the user's residence) based on the generated response (e.g., sending a signal to turn on the television based on the response generated by an audio input from the user). In another example, the classification system 500 can initiate a transaction with a web server 535 over the Internet based on the generated response (e.g., sending a signal to the web server 535 to purchase a movie stored in media storage 537 based on the response generated by an audio input from the user). The classification system disclosed herein is not limited to processing audio signals but can be used to train a neural network to process different input (e.g., image data, video data, etc.) as well.

In various embodiments, the forward pass processing module 544 comprises a plurality trained neural networks that may include a start detector neural network and an end detector neural network for detecting a Region of Target in an input stream, and a multi-class classification system neural network for classifying acoustic events within a detected Region of Target.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method comprising:
    receiving an audio input stream including a plurality of audio frames;
    extracting from each audio frame features representative of the audio frame;
    detecting an end point in the extracted features using a first neural network;
    providing an indication to a second neural network when an end point is detected; and
    detecting a start point in the extracted features from audio frames preceding the detected end point in the audio input stream using the second neural network.

2. The method of claim 1, wherein extracting from each audio frame features representative of the audio frame includes generating Mel-frequency cepstral coefficients (MFCCs) for each frame of the audio input stream.

3. The method of claim 1, further comprising training the first neural network for end point detection.

4. The method of claim 1, further comprising training the second neural network for start point detection.

5. The method of claim 1, further comprising receiving, at a computing device, a stream of training data including a plurality of input samples having segmented labeled data;
    computing, by the first neural network, a network output for each input sample in a forward pass through the training data; and
    updating, by the first neural network, weights and biases through a backward pass through the first neural network, including determining whether an input frame is in a Region of Target (ROT).

6. The method of claim 5, further comprising training the first neural network, weights and biases based on a cross-entropy cost function for non-ROT frames and a One-Spike Connectionist Temporal Classification (OSCTC) cost function for ROT frames;
    wherein the first neural network is trained using the OSCTC cost function to cause the neural network to spike one time during the ROT.

7. The method of claim 6, wherein updating, by the first neural network, weights and biases through the backward pass further comprises computing a signal error for all output nodes using the cross-entropy cost function for non-ROT regions.

8. The method of claim 5, further comprising:
    calculating a signal output error for each network output based on a determination of whether the input frame is in the ROT; and
    updating the weights and biases during a backward pass based on the calculated signal output error.

9. The method of claim 8, wherein updating the weights and biases during the backward pass further comprises applying a cross-entropy cost function if the input frame is not in the ROT and applying OSCTC cost function if the input frame is in the ROT.

10. The method of claim 1, wherein the first neural network is trained for keyword and end point detection, and wherein the first neural network is trained to generate a spike when the keyword is detected.

11. A system comprising:
    a feature extractor configured to receive an audio input stream comprising a sequence of frames and generate corresponding feature data for each frame;
    an end detector comprising a first neural network trained to generate a detection probability for an end point of an acoustic event, the end detector configured to receive the feature data and detect the end point of the acoustic event when the detected probability is greater than a pre-determined end-point threshold;
    a start detector configured to receive an indication of the detected end point and process the feature data associated with corresponding input frames to detect a start point of the acoustic event;
    wherein the frames in the audio input stream from the start point to the end point comprise a region of interest of the acoustic event; and
    wherein the first neural network is trained using a backward pass process that comprises determining whether an input frame is in a Region of Target (ROT), and applying a One-Spike Connectionist Temporal Classification (OSCTC) cost function for ROT frames.

12. The system of claim 11, wherein the feature extractor is configured to compute Mel-frequency cepstral coefficients (MFCCs) for each frame of the audio input stream.

13. The system of claim 11, further comprising a buffer configured to receive the feature and provide the corresponding feature data associated with corresponding input frames to the start detector.

14. The system of claim 11, wherein the start detector comprises a second neural network trained to generate a detection probability for the start point of the acoustic event; and wherein the start point is detected when the detection probability is greater than a pre-determined start point threshold.

15. A system comprising:

a feature extractor configured to receive an audio input stream comprising a sequence of frames and generate corresponding feature data for each frame;

an end detector configured to receive the feature data and detect an end point of an acoustic event; and a start detector configured to receive an indication of the detected end point and process the feature data associated with corresponding input frames to detect a start point of the acoustic event;

wherein the frames in the audio input stream from the start point to the end point comprise a region of interest of the acoustic event;

wherein the start detector comprises a first neural network trained to generate a detection probability for the start point of the acoustic event;

wherein the start point is detected when the detection probability is greater than a pre-determined start point threshold;

wherein the end detected comprises a second neural network trained to generate a detection probability for the end point of the acoustic event; and wherein the end point is detected when the detection probability is greater than a pre-determined end point threshold.

16. The system of claim 15, wherein the second neural network is trained through a process comprising:

receiving, at a computing device, a stream of training data including a plurality of input samples having segmented labeled data;

computing, by the second neural network, a network output for each input sample in a forward pass through the training data; and updating, by the second neural network, weights and biases through a backward pass through the first neural network, including determining whether an input frame is in a Region of Target (ROT).

17. The system of claim 16, wherein the weights and biases are updated based on a cross-entropy cost function for non-ROT frames and a One-Spike Connectionist Temporal Classification (OSCTC) cost function for ROT frames;

wherein the first neural network is trained using the OSCTC cost function to cause the neural network to spike one time during the ROT.

18. The system of claim 17, wherein the weights and biases are updated through the backward pass by computing a signal error for all output nodes using the cross-entropy cost function for non-ROT regions.

19. The system of claim 15, wherein the end detector comprises a neural network trained to generate a detection probability for the end point of the acoustic event; and wherein the end point is detected when the detection probability is greater than a pre-determined end point threshold.

20. The system of claim 15, wherein the start detector comprises a first neural network trained to generate a detection probability for the start point of the acoustic event; and wherein the start point is detected when the detection probability is greater than a pre-determined start point threshold.

* * * * *